US012680766B2

(12) United States Patent
Kurosawa et al.

(10) Patent No.: US 12,680,766 B2
(45) Date of Patent: Jul. 14, 2026

(54) HEAT EXCHANGER AND METHOD FOR MANUFACTURING THE SAME

(71) Applicant: HONDA MOTOR CO., LTD., Tokyo (JP)

(72) Inventors: Yuta Kurosawa, Saitama (JP); Tsuneo Endo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 437 days.

(21) Appl. No.: 18/129,369

(22) Filed: Mar. 31, 2023

(65) Prior Publication Data

US 2023/0314087 A1 Oct. 5, 2023

(30) Foreign Application Priority Data

Mar. 31, 2022 (JP) ................................. 2022-059104

(51) Int. Cl.
*F28F 7/02* (2006.01)
*B33Y 80/00* (2015.01)
(Continued)

(52) U.S. Cl.
CPC .............. *F28F 7/02* (2013.01); *F28D 9/0037* (2013.01); *F28F 3/025* (2013.01); *B33Y 80/00* (2014.12)

(58) Field of Classification Search
CPC .... F28F 7/02; F28F 21/04; F28F 21/06; F28F 21/08; F28F 13/00; F28F 2250/10;
(Continued)

(56) References Cited

U.S. PATENT DOCUMENTS 10,107,555 B1 * 10/2018 Miller ..................... B23P 15/26
2008/0149299 A1 * 6/2008 Slaughter ............. B22F 3/1115
430/269
(Continued)

FOREIGN PATENT DOCUMENTS

JP         5293077 B2     9/2013
JP    2019-155279 A      9/2019

OTHER PUBLICATIONS

Aug. 12, 2025, Translation of Japanese Office Action issued for related JP Application No. 2022-059104.
(Continued)

*Primary Examiner* — Jianying C Atkisson
*Assistant Examiner* — For K Ling
(74) *Attorney, Agent, or Firm* — Paratus Law Group, PLLC

(57) ABSTRACT

A heat exchanger including: a first flow path configured to allow a first fluid to flow therethrough; a second flow path adjacent to the first flow path and configured to allow a second fluid to flow therethrough; and a housing accommodating the first flow path and the second flow path. The heat exchanger performs heat exchange inside the housing between the first fluid flowing through the first flow path and the second fluid flowing through the second flow path. Inside the housing, the first flow path and the second flow path are partitioned by a partition wall and form flow paths independent of each other, the partition wall has a three-dimensional curved surface shape, and the first flow path and the second flow path extend three-dimensionally.

9 Claims, 2 Drawing Sheets

(51) Int. Cl.
  *F28D 9/00*       (2006.01)
  *F28F 3/02*       (2006.01)

(58) Field of Classification Search
  CPC ........... F28F 2250/102; F28F 2250/106; F28F
         2250/108; F28F 13/12; B33Y 80/00
  See application file for complete search history.

(56)                References Cited

U.S. PATENT DOCUMENTS

| | | | |
|---|---|---|---|
| 2017/0028589 A1* | 2/2017 | Capobianco .......... | B01F 23/711 |
| 2018/0187984 A1* | 7/2018 | Manzo .................... | F28F 13/12 |
| 2020/0033070 A1* | 1/2020 | Vlahinos ........... | B01F 25/43231 |
| 2020/0292239 A1* | 9/2020 | Wiedenhoefer ......... | G06F 30/17 |
| 2020/0309469 A1* | 10/2020 | Maxwell .............. | F28D 15/046 |
| 2021/0156339 A1 | 5/2021 | Rathay et al. | |

OTHER PUBLICATIONS

Jan. 24, 2026, Translation of Chinese Office Action issued for
related CN Application No. 202310310696.7.

* cited by examiner

HEAT EXCHANGER AND METHOD FOR MANUFACTURING THE SAME

CROSS-REFERENCE TO RELATED APPLICATIONS

This application is based on and claims priority under 35 USC 119 from Japanese Patent Application No. 2022-059104 filed on Mar. 31, 2022, the entire content of which is incorporated herein by reference.

TECHNICAL FIELD

The present invention relates to a heat exchanger and a method for manufacturing the same.

BACKGROUND ART

In the related art, heat exchangers using various heat transfer methods have been widely used as devices for transferring heat between two fluids having different temperatures. For example, JP5293077B proposes a surface type (partition wall type) heat exchanger in which two fluids flow in two spaces partitioned by a partition wall, respectively, and heat exchange is performed between the two fluids by heat transfer or the like via the partition wall.

On the other hand, in recent years, researches and developments have been actively conducted that contribute to an increase in energy efficiency in order to allow more people to access affordable, reliable, sustainable and advanced energy. In a heat exchanger, improvement in heat exchange efficiency is required in order to contribute to improvement in energy efficiency.

However, in the heat exchanger of JP5293077B, factors such as turbulence of a heat generating fluid (for example, exhaust gas) and a refrigerant (for example, cooling water) and a wall area where the heat generating fluid and the refrigerant come into contact with each other have not been sufficiently studied, and it is difficult to expect a significant improvement in the heat exchange efficiency.

An aspect of the present disclosure relates to provide a heat exchanger with improved heat exchange efficiency and a method for manufacturing the heat exchanger.

SUMMARY OF INVENTION

According to an aspect of the present disclosure, there is provided a heat exchanger including: a first flow path configured to allow a first fluid to flow therethrough; a second flow path adjacent to the first flow path and configured to allow a second fluid to flow therethrough; and a housing accommodating the first flow path and the second flow path. The heat exchanger performs heat exchange inside the housing between the first fluid flowing through the first flow path and the second fluid flowing through the second flow path. Inside the housing, the first flow path and the second flow path are partitioned by a partition wall and form flow paths independent of each other, the partition wall has a three-dimensional curved surface shape, and the first flow path and the second flow path extend three-dimensionally.

BRIEF DESCRIPTION OF DRAWINGS

FIGS. 2A and 2B are views showing a housing in the heat exchanger of FIG. 1, in which FIG. 2A is a perspective view of the housing, and FIG. 2B is a cross-sectional view of the housing.

DESCRIPTION OF EMBODIMENTS

Figure 1:
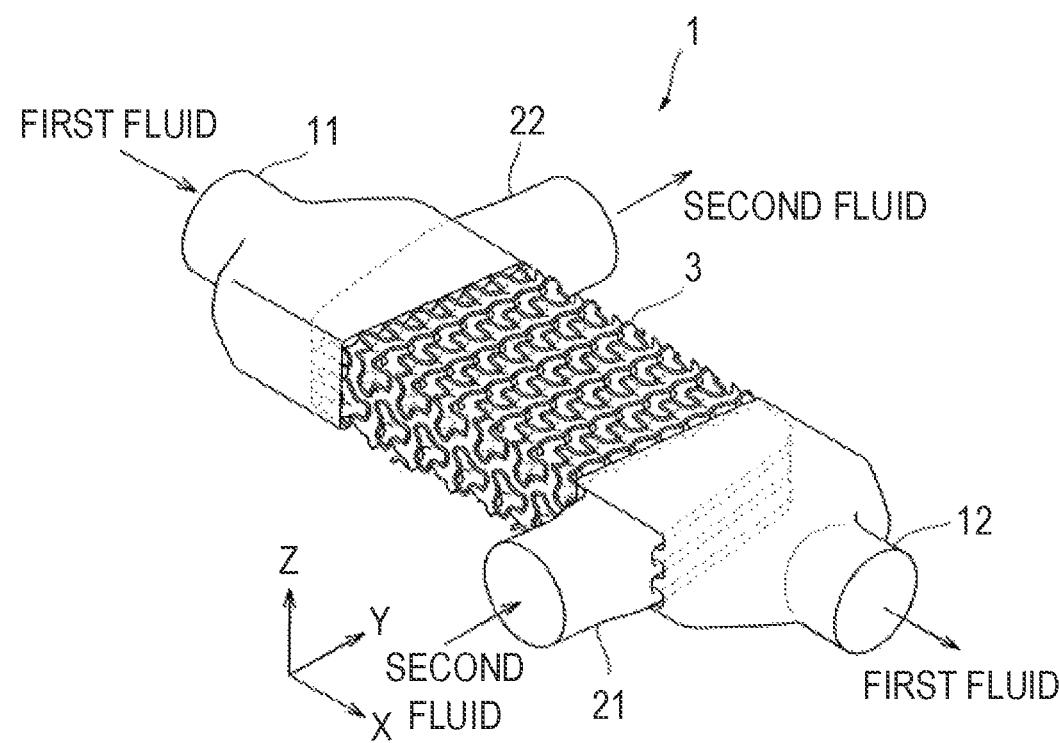
FIG. 1 is a perspective view of a heat exchanger according to an embodiment of the present invention.

Hereinafter, an embodiment of a heat exchanger according to the present disclosure will be described with reference to the accompanying drawings. Noted that the drawings are viewed in directions of reference numerals.

As shown in FIG. 1, the heat exchanger 1 according to the present embodiment is a device for performing heat exchange between a first fluid to be cooled and a second fluid that is a refrigerant for cooling the first fluid. The heat exchanger 1 is mounted on a device (a vehicle or the like) on which an internal combustion engine such as an engine is mounted.

Figure 2A:
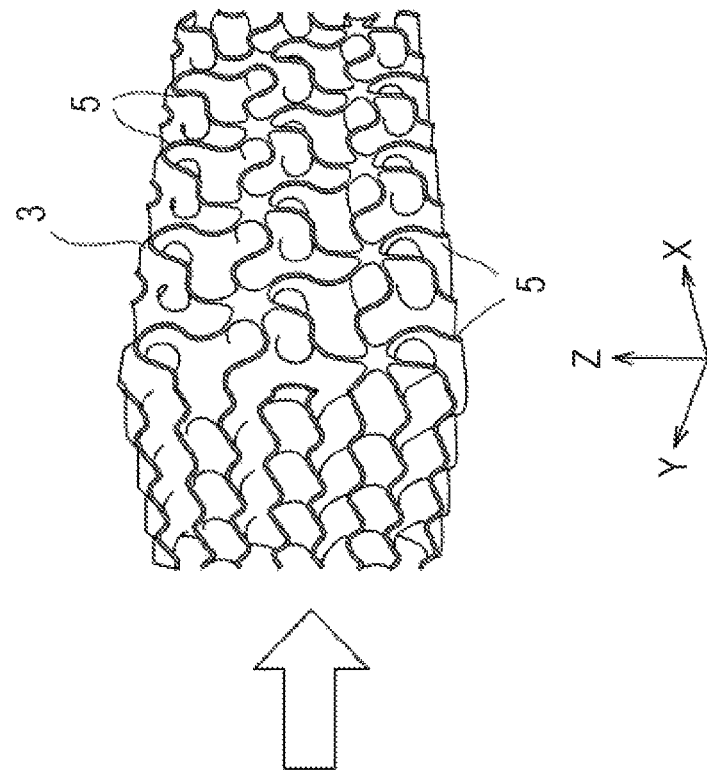
Figure 2B:
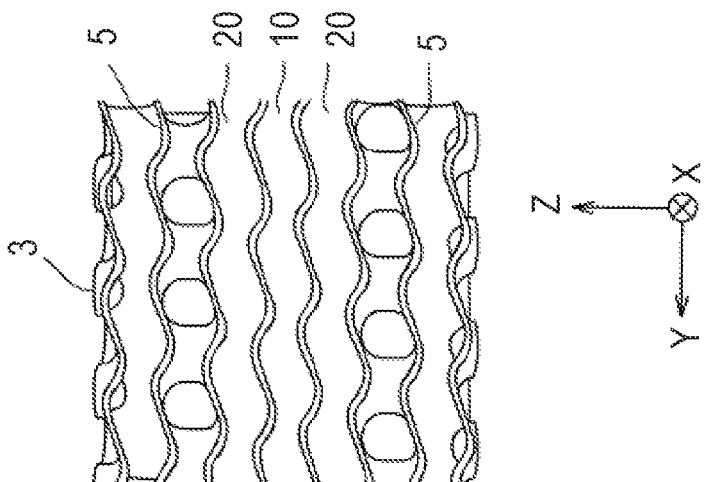

As shown in FIGS. 1, 2A, and 2B, the heat exchanger 1 includes a first flow path 10 through which a first fluid flows, second flow paths 20 that are adjacent to the first flow path 10 and through which a second fluid flows, and a housing 3 that accommodates the first flow path 10 and the second flow paths 20. The heat exchanger 1 exchanges heat between the first fluid flowing through the first flow path 10 and the second fluid flowing through the second flow path 20 inside the housing 3. The first fluid is, for example, exhaust gas discharged from the internal combustion engine, and the second fluid is, for example, cooling water or air as the refrigerant.

In the present specification and the like, an XYZ orthogonal coordinate system indicating directions with respect to the heat exchanger 1 is set in order to simplify and clarify the description. The XYZ orthogonal coordinate system includes an X axis along a longitudinal direction of the heat exchanger 1, a Y axis along a width direction of the heat exchanger 1, and a Z axis along a height direction orthogonal to both the X axis and the Y axis.

Inside the housing 3, the first flow path 10 and the second flow path 20 are partitioned by a partition wall 5 and form flow paths independent of each other. The partition wall 5 has a three-dimensional curved surface shape, and the first flow path 10 and the second flow path 20 extend three-dimensionally. With such a configuration, inside the housing 3, a contact area between the first flow path 10 and the second flow path 20 can be increased, so that heat exchange efficiency between the first fluid and the second fluid is improved.

The three-dimensional curved surface shape of the partition wall 5 is achieved by, for example, a gyroid structure. The gyroid structure is constituted by a curved surface represented by an approximate expression of $\sin a \cdot \cos b + \sin b \cdot \cos c + \sin c \cdot \cos a = 0$ using a trigonometric function when coordinates in an orthogonal coordinate system of an a axis, a b axis, and a c axis orthogonal to each other are (a, b, c). Since the partition wall 5 has the three-dimensional curved surface shape of the gyroid structure, a flow of the first fluid flowing through the first flow path 10 and a flow of the second fluid flowing through the second flow path 20 are easily stirred inside the housing 3. Therefore, when a flow velocity of the first fluid flowing through the first flow path 10 and a flow velocity of the second fluid flowing through the second flow path 20 are high, a turbulent flow is likely to be generated, so that the heat exchange efficiency between the first fluid and the second fluid is further improved.

Returning to FIG. 1, the heat exchanger 1 further includes a first introduction port 11, a first discharge port 12, a second introduction port 21, and a second discharge port 22. The first introduction port 11 is provided at one end of the housing 3 in a X-axis direction, and introduces the first fluid from the outside into the first flow path 10. The first discharge port 12 is provided at the other end of the housing 3 in the X-axis direction, and discharges the first fluid flowing through the first flow path 10 to the outside.

The second introduction port 21 is provided at the other end of the housing 3 so as to be adjacent to the first discharge port 12, and introduces the second fluid into the second flow path 20 from the outside. The second discharge port 22 is provided at the other end of the housing 3 so as to be adjacent to the first introduction port 11, and discharges the second fluid flowing through the second flow path 20 to the outside.

As described above, in the heat exchanger 1 according to the present embodiment, the first introduction port 11 of the first fluid and the second introduction port 21 of the second fluid are disposed at positions opposite to each other with respect to the housing 3. Similarly, the first discharge port 12 of the first fluid and the second discharge port 22 of the second fluid are disposed at positions opposite to each other with respect to the housing 3. That is, a flow direction of the first fluid and a flow direction of the second fluid are opposite to each other at least in the inside of the housing 3, and are so-called counterflows, and therefore the heat exchange efficiency is further improved.

An arrow in FIG. 2A indicates a flow direction of the first fluid, and the flow direction of the second fluid is opposite to the arrow. FIG. 2B shows one cross section of the housing 3, but similar cross sections are periodically formed inside the housing 3. As shown in FIG. 2B, in a predetermined cross section of the housing 3, in the present embodiment, in the predetermined cross section perpendicular to the flow directions (that is, the X-axis direction) of the first fluid and the second fluid, the first flow path 10 through which the first fluid flows and the second flow path 20 through which the second fluid flows are alternately arranged in one direction, that is, in an upper-lower direction (a Z-axis direction) in the present embodiment. Accordingly, the heat exchange efficiency between the first fluid and the second fluid is further improved, and the first introduction port 11 and the second discharge port 22, and the first discharge port 12 and the second introduction port 21 can be easily formed. In FIG. 2B, the first fluid flows from a front side toward a back side of a paper surface, and the second fluid flows from the back side toward the front side of the paper surface.

In the present embodiment, the partition wall 5 is formed so that all of the above a axis, b axis, and c axis of the gyroid structure do not coincide with the flow directions of the first fluid and the second fluid (that is, the X-axis direction).

For example, the gyroid structure of the partition wall 5 has a shape obtained by rotating 45 degrees around a Y-axis direction and 54.7 degrees around the X axis direction from a state in which the above a axis, b axis, and c axis of the gyroid structure coincide with the X axis, Y axis, and Z axis of the heat exchanger 1, respectively.

As described above, the orthogonal coordinate system of the gyroid structure is rotated around the X axis and the Y axis of the housing 3 by a predetermined angle so that the above a axis, b axis, and c axis of the gyroid structure do not coincide with the flow direction of the fluid in the housing 3, and therefore a space is less likely to be linearly formed in the flow directions of the first fluid and the second fluid (that is, the X-axis direction) in the first flow path 10 and the second flow path 20. As a result, in the first flow path 10 and the second flow path 20, the fluid flows so as to undulate in a three-dimensional direction, and a surface area of the gyroid structure can be effectively used.

In such a configuration, a movement distance of the first fluid flowing through the first flow path 10 from the first introduction port 11 to the first discharge port 12 of the housing 3 and a movement distance of the second fluid flowing through the second flow path 20 from the second introduction port 21 to the second discharge port 22 can be made longer. This further improves the heat exchange efficiency between the first fluid and the second fluid.

The housing 3 and the partition wall 5 are formed by additive manufacturing a powdery material using a known 3D printing technique. The additive manufacturing using the 3D printing technique is a known forming technique in which a powdery material is melted by an electron beam or a fiber laser and is formed by additive solidification, and is a method in which a three-dimensionally complicated shape can be formed and a fine and dense 3D shape can be shaped. Therefore, by forming the partition wall 5 by additive manufacturing a powdery material, it is possible to form the partition wall 5 having a three-dimensional curved surface shape that is difficult to be manufactured by cutting, forging, punching, or the like, which is a general processing method, with high accuracy and at low cost. For example, the housing 3 and the partition wall 5 are formed by additive manufacturing metal powder using the known 3D printing technique. The housing 3 and the partition wall 5 may be formed by additive manufacturing a powdery resin using the known 3D printing technique, or may be formed by additive manufacturing a ceramic powder using the known 3D printing technique.

Although the drawings show a large number of opening portions formed in an outer surface of the housing 3, the opening portions are closed at the time of additive manufacturing.

Although an embodiment of the present invention has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, respective constituent elements in the above embodiment may be freely combined without departing from the gist of the invention.

For example, in the heat exchanger 1 according to the present embodiment, the flow direction of the first fluid and the flow direction of the second fluid are counterflows at least inside the housing 3, but the heat exchanger 1 may have a parallel flow in which the flow direction of the first fluid and the flow direction of the second fluid are the same at least inside the housing 3.

In the present specification, at least the following matters are described. In the parentheses, the corresponding constituent elements and the like in the above embodiment are shown as an example, but the present invention is not limited thereto.

(1) A heat exchanger (heat exchanger 1) including: a first flow path (first flow path 10) configured to allow a first fluid to flow therethrough;

a second flow path (second flow path 20) adjacent to the first flow path and configured to allow a second fluid to flow therethrough; and a housing (housing 3) accommodating the first flow path and the second flow path, in which the heat exchanger performs heat exchange inside the housing between the first fluid flowing through the first flow path and the second fluid flowing through the second flow path, in which inside the housing, the first flow path and the second flow path are partitioned by a partition wall (partition wall 5) and form flow paths independent of each other, in which the partition wall has a three-dimensional curved surface shape, and in which the first flow path and the second flow path extend three-dimensionally.

According to (1), since a contact area between the first flow path and the second flow path can be increased inside the housing, the heat exchange efficiency between the first fluid and the second fluid is improved.

(2) The heat exchanger according to (1), in which the three-dimensional curved surface shape of the partition wall has a gyroid structure.

According to (2), a flow of the first fluid flowing through the first flow path and a flow of the second fluid flowing through the second flow path are easily stirred inside the housing. Therefore, when a flow velocity of the first fluid flowing through the first flow path and a flow velocity of the second fluid flowing through the second flow path are high, a turbulent flow is likely to be generated, so that the heat exchange efficiency between the first fluid and the second fluid is further improved.

(3) The heat exchanger according to (2), further including:

a first introduction port (first introduction port 11) configured to allow the first fluid to be introduced into the first flow path.

a first discharge port (first discharge port 12) configured to allow the first fluid flowing through the first flow path to be discharged from the first flow path;

a second introduction port (second introduction port 21) configured to allow the second fluid to be introduced into the second flow path; and a second discharge port (second discharge port 22) configured to allow the second fluid flowing through the second flow path to be discharged from the second flow path, in which the first introduction port is provided at a first end of the housing in a first direction (X-axis direction), in which the first discharge port is provided at a second end of the housing opposite to the first end in the first direction, in which the second introduction port is provided at one of the first end and the second end of the housing, in which the second discharge port is provided at another of the first end and the second end of the housing, in which the gyroid structure is constituted by a curved surface represented by an approximate expression of sin a·cos b+sin b·cos c+sin c·cos a=0 using a trigonometric function when coordinates in an orthogonal coordinate system of an a axis, a b axis, and a c axis orthogonal to each other are (a, b, c), and in which the partition wall is formed such that the a axis, the b axis, and the c axis of the gyroid structure do not coincide with the first direction.

According to (3), since the partition wall is formed such that all of the a axis, the b axis, and the c axis of the gyroid structure do not coincide with the first direction, a space is less likely to be linearly formed in the first direction in the first flow path and the second flow path. As a result, in the first flow path and the second flow path, the fluid flows so as to undulate in a three-dimensional direction, and a surface area of the gyroid structure can be effectively used.

(4) The heat exchanger according to any one of (1) to (3), in which the first flow path and the second flow path are alternately arranged in one direction in a predetermined cross section of the housing.

According to (4), the heat exchange efficiency between the first fluid and the second fluid is further improved, and the first introduction port and the second discharge port, and the first discharge port and the second introduction port can be easily formed.

(5) The heat exchanger according to any one of (1) to (4), in which a flow direction of the first fluid and a flow direction of the second fluid are opposite to each other inside the housing.

According to (5), since the flow of the first fluid and the flow of the second fluid can be so-called counterflows, the heat exchange efficiency is further improved.

(6) The heat exchanger according to any one of (1) to (4), in which a flow direction of the first fluid and a flow direction of the second fluid are the same inside the housing.

According to (6), since the flow of the first fluid and the flow of the second fluid can be made to be so-called parallel flows, the heat exchange efficiency is improved.

(7) The heat exchanger according to any one of (1) to (6), in which the partition wall is formed by additive manufacturing using powdery material.

According to (7), since the partition wall is formed by additive manufacturing using powdery material, it is possible to form the partition wall having a three-dimensional curved surface shape that is difficult to be manufactured by cutting, forging, punching, or the like, which is a general processing method, with high accuracy and at low cost.

(8) The heat exchanger according to (7), in which the powdery material is metal powder.

According to (8), the metal heat exchanger including the partition wall having the three-dimensional curved surface shape, which is difficult to shape, can be formed with high accuracy and at low cost.

(9) The heat exchanger according to (7), in which the powdery material is a powdery resin.

According to (9), the resin heat exchanger including the partition wall having the three-dimensional curved surface shape, which is difficult to shape, can be formed with high accuracy and at low cost.

(10) The heat exchanger according to (7), in which the powdery material is ceramic powder.

According to (10), the ceramic heat exchanger including the partition wall having the three-dimensional curved surface shape, which is difficult to shape, can be formed with high accuracy and at low cost.

(11) A method for manufacturing a heat exchanger (heat exchanger 1), the heat exchanger including: a first flow path (first flow path 10) configured to allow a first fluid to flow therethrough;

a second flow path (second flow path 20) adjacent to the first flow path and configured to allow a second fluid to flow therethrough; and a housing (housing 3) accommodating the first flow path and the second flow path, inside the housing, the first flow path and the second flow path being partitioned by a partition wall (partition wall 5) and forming flow paths independent of each other, and the heat exchanger being configured to perform heat exchange between the first fluid flowing through the first flow path and the second fluid flowing through the second flow path, the method including:

forming the partition wall having a three-dimensional curved surface shape such that the first flow path and the second flow path extend three-dimensionally by additive manufacturing using powdery material.

According to (11), since it is possible to manufacture a heat exchanger including a partition wall having a three-dimensional curved surface shape that is difficult to form by cutting, forging, punching, or the like, which is a general processing method, inside the housing, a contact area between the first flow path and the second flow path can be increased, and heat exchange efficiency between the first fluid and the second fluid is improved.

What is claimed is:

1. A heat exchanger comprising:

a first flow path configured to allow a first fluid to flow therethrough;

a second flow path adjacent to the first flow path and configured to allow a second fluid to flow therethrough; and a housing accommodating the first flow path and the second flow path, wherein the heat exchanger performs heat exchange inside the housing between the first fluid flowing through the first flow path and the second fluid flowing through the second flow path, wherein inside the housing, the first flow path and the second flow path are partitioned by a partition wall and form flow paths independent of each other, wherein the partition wall has a three-dimensional curved surface shape, wherein the first flow path and the second flow path extend three-dimensionally, wherein the three-dimensional curved surface shape of the partition wall has a gyroid structure, wherein the heat exchanger further comprises:

a first introduction port configured to allow the first fluid to be introduced into the first flow path;

a first discharge port configured to allow the first fluid flowing through the first flow path to be discharged from the first flow path;

a second introduction port configured to allow the second fluid to be introduced into the second flow path; and a second discharge port configured to allow the second fluid flowing through the second flow path to be discharged from the second flow path, wherein the first introduction port is provided at a first end of the housing in a first direction, wherein the first discharge port is provided at a second end of the housing opposite to the first end in the first direction, wherein the second introduction port is provided at one of the first end and the second end of the housing, wherein the second discharge port is provided at another of the first end and the second end, wherein the first direction coincides with a flow direction of the first fluid and a flow direction of the second fluid, wherein the gyroid structure is constituted by a curved surface represented by an approximate expression of $\sin a \cdot \cos b + \sin b \cdot \cos c + \sin c \cdot \cos a = 0$ using a trigonometric function when coordinates in an orthogonal coordinate system of an a axis, a b axis, and a c axis orthogonal to each other are (a, b, c), and wherein the partition wall is formed such that the a axis, the b axis, and the c axis of the gyroid structure do not coincide with the first direction, by rotating the orthogonal coordinate system of the a axis, the b axis, and the c axis, from a state in which the a axis, the b axis, and the c axis coincide with a X axis extending along the first direction, a Y axis, and a Z axis of another orthogonal coordinate system, around the Y axis by a predetermined angle and around the X axis by a predetermined angle.

2. The heat exchanger according to claim 1, wherein the first flow path and the second flow path are alternately arranged in one direction in a predetermined cross section of the housing.

3. The heat exchanger according to claim 1, wherein a flow direction of the first fluid and a flow direction of the second fluid are opposite to each other inside the housing so that the first fluid and the second fluid are counterflows with each other.

4. The heat exchanger according to claim 1, wherein a flow direction of the first fluid and a flow direction of the second fluid are the same inside the housing.

5. The heat exchanger according to claim 1, wherein the partition wall is formed by additive manufacturing using powdery material.

6. The heat exchanger according to claim 5, wherein the powdery material is metal powder.

7. The heat exchanger according to claim 5, wherein the powdery material is a powdery resin.

8. The heat exchanger according to claim 5, wherein the powdery material is ceramic powder.

9. A method for manufacturing a heat exchanger, the heat exchanger including:

a first flow path configured to allow a first fluid to flow therethrough;

a second flow path adjacent to the first flow path and configured to allow a second fluid to flow therethrough; and a housing accommodating the first flow path and the second flow path, the first flow path and the second flow path being partitioned by a partition wall and forming flow paths independent of each other, and the heat exchanger being configured to perform heat exchange between the first fluid flowing through the first flow path and the second fluid flowing through the second flow path, the method comprising:

forming the partition wall having a three-dimensional curved surface shape such that the first flow path and the second flow path extend three-dimensionally by additive manufacturing using powdery material, wherein the three-dimensional curved surface shape of the partition wall has a gyroid structure, the heat exchanger further comprises:

a first introduction port configured to allow the first fluid to be introduced into the first flow path;

a first discharge port configured to allow the first fluid flowing through the first flow path to be discharged from the first flow path;

a second introduction port configured to allow the second fluid to be introduced into the second flow path; and a second discharge port configured to allow the second fluid flowing through the second flow path to be discharged from the second flow path, wherein the first introduction port is provided at a first end of the housing in a first direction, wherein the first discharge port is provided at a second end of the housing opposite to the first end in the first direction, wherein the second introduction port is provided at one of the first end and the second end of the housing, wherein the second discharge port is provided at another of the first end and the second end, wherein the first direction coincides with a flow direction of the first fluid and a flow direction of the second fluid, wherein the gyroid structure is constituted by a curved surface represented by an approximate expression of $\sin a \cdot \cos b + \sin b \cdot \cos c + \sin c \cdot \cos a = 0$ using a trigonometric function when coordinates in an orthogonal coordinate system of an a axis, a b axis, and a c axis orthogonal to each other are (a, b, c), and wherein the partition wall is formed such that the a axis, the b axis, and the c axis of the gyroid structure do not coincide with the first direction, by rotating the orthogonal coordinate system of the a axis, the b axis, and the c axis, from a state in which the a axis, the b axis, and the c axis coincide with a X axis extending along the first direction, a Y axis, and a Z axis of another orthogonal coordinate system, around the Y axis by a predetermined angle and around the X axis by a predetermined angle.

* * * * *